US010285495B1

(12) United States Patent
Valme et al.

(10) Patent No.: US 10,285,495 B1
(45) Date of Patent: May 14, 2019

(54) PORTABLE DESK TRAY TABLE

(71) Applicants: Ronald Joseph Valme, Miami, FL (US); Ian Eugene Woodson, Homestead, FL (US)

(72) Inventors: Ronald Joseph Valme, Miami, FL (US); Ian Eugene Woodson, Homestead, FL (US)

( * ) Notice: Subject to any disclaimer, the term of this patent is extended or adjusted under 35 U.S.C. 154(b) by 0 days.

(21) Appl. No.: 15/696,497

(22) Filed: Sep. 6, 2017

(51) Int. Cl.
| | |
|---|---|
| A47B 3/10 | (2006.01) |
| A47B 13/08 | (2006.01) |
| A47B 13/16 | (2006.01) |
| A47B 23/00 | (2006.01) |
| A47B 23/06 | (2006.01) |
| B60N 3/00 | (2006.01) |
| B60N 3/10 | (2006.01) |
| A45C 13/00 | (2006.01) |
| A47B 21/03 | (2006.01) |

(52) U.S. Cl.
CPC .............. *A47B 3/10* (2013.01); *A45C 13/001* (2013.01); *A47B 13/081* (2013.01); *A47B 13/16* (2013.01); *A47B 21/0314* (2013.01); *A47B 23/002* (2013.01); *A47B 23/06* (2013.01); *B60N 3/002* (2013.01); *B60N 3/10* (2013.01); *A47B 2200/0081* (2013.01); *A47B 2200/0095* (2013.01)

(58) Field of Classification Search
CPC ....... A47B 3/10; A47B 3/002; A47B 21/0314; A47B 23/002; A47B 23/06; A47B 13/081; A47B 13/16; A47B 2200/0081; A47B 2200/0095; A47B 17/065; A47B 23/02; A47B 23/04; A47C 13/001; B60N 3/002; B60N 3/10

USPC ........ 108/50.02, 43, 42, 47, 134, 135, 46, 5, 108/157.13, 25, 27, 28, 97, 98, 15, 2; 206/570, 363; 211/85.13; 248/222.14, 248/229.13, 229.23, 227.4, 231.51; 190/11
See application file for complete search history.

(56) References Cited

U.S. PATENT DOCUMENTS

| 4,357,881 A * | 11/1982 | De Long | A47B 23/02 108/135 |
|---|---|---|---|
| 5,072,908 A * | 12/1991 | Lodrick | A47F 7/0028 211/68 |
| 6,279,800 B1 * | 8/2001 | Lee | B60N 3/005 108/44 |
| 6,322,030 B1 * | 11/2001 | Marra | B63B 17/00 248/176.1 |

(Continued)

*Primary Examiner* — Janet M Wilkens
(74) *Attorney, Agent, or Firm* — Albert Bordas, P.A.

(57) ABSTRACT

A portable desk tray table, which has at least one clamp assembly, a frame assembly, and a table assembly. The at least one clamp assembly has an upper jaw and a lower jaw. The frame assembly has an upper rod, a lower rod, and first and second laterals rods with respective table supports. The at least one clamp assembly is mounted onto the frame assembly. The frame assembly further has a collapsible bracket coupled to the lower rod. The table assembly has an upper face and a lower face and is coupled to the frame assembly through the table supports. The lower face has first and second sets of tension holders to secure the collapsible bracket. The table assembly is collapsible and the at least one clamp assembly mounts onto an elongated structure which is secured by the upper jaw and the lower jaw.

16 Claims, 4 Drawing Sheets

(56) References Cited

U.S. PATENT DOCUMENTS

| | | | | |
|---|---|---|---|---|
| 6,439,134 B1* | 8/2002 | Ryburg | A45C 7/00 | 108/42 |
| 6,928,932 B1* | 8/2005 | Ferrill | A47B 37/00 | 108/23 |
| 7,607,625 B2* | 10/2009 | Wang | F16M 11/24 | 108/50.02 |
| 8,327,774 B1* | 12/2012 | Rivera | B60N 3/005 | 108/44 |
| 8,393,506 B2* | 3/2013 | Malm | B60R 9/10 | 224/319 |
| 9,498,055 B2* | 11/2016 | Distefano | A47B 5/04 | |
| 2009/0072107 A1* | 3/2009 | Wilson | A61B 90/50 | 248/279.1 |
| 2011/0200219 A1* | 8/2011 | Vizcarra | G06F 1/1632 | 381/332 |
| 2012/0160136 A1* | 6/2012 | Lineal | A47B 23/04 | 108/43 |
| 2012/0181313 A1* | 7/2012 | Sautter | B60R 9/042 | 224/310 |
| 2012/0241571 A1* | 9/2012 | Masionis | A61G 1/04 | 248/214 |
| 2013/0032443 A1* | 2/2013 | Soedomo | 190/11 | |
| 2013/0161463 A1* | 6/2013 | Toms | A47C 1/126 | 248/240.4 |
| 2014/0110544 A1* | 4/2014 | Chang | F16M 11/041 | 248/207 |
| 2014/0238799 A1* | 8/2014 | Sharma | B62B 1/125 | 190/11 |
| 2015/0069797 A1* | 3/2015 | Goldberg | A47B 83/02 | 297/135 |
| 2015/0351779 A1* | 12/2015 | Slagle | A61G 13/101 | 211/85.13 |
| 2016/0022032 A1* | 1/2016 | Simon | A45C 13/28 | 108/42 |
| 2017/0086576 A1* | 3/2017 | Smith | A47B 23/06 | |
| 2017/0325560 A1* | 11/2017 | Williams | A45C 13/28 | |

\* cited by examiner

PORTABLE DESK TRAY TABLE

BACKGROUND OF THE INVENTION

1. Field of the Invention

The present invention relates to portable desks, and more particularly, to portable desk tray tables.

2. Description of the Related Art

Applicant is not aware of any prior art suggesting the novel features of the present invention.

SUMMARY OF THE INVENTION

The present invention is a portable desk tray table, comprising at least one clamp assembly, a frame assembly, and a table assembly.

The at least one clamp assembly comprises an upper jaw and a lower jaw. The upper jaw comprises a wall having a notch, first and second lateral walls with respective holes, and a top hole. The lower jaw comprises a mounting wall, a slot, and a dowel nut hole. The at least one clamp assembly comprises a clamp lever handle, a guide shaft, a top dowel nut, and a bottom dowel nut. The top dowel nut is coupled to the clamp lever handle, and the bottom dowel nut is coupled to the lower jaw. The guide shaft extends from the top dowel nut and extends through the top hole, through the bottom dowel nut, and to a nut.

The frame assembly comprises an upper rod, a lower rod, and first and second laterals rods with respective table supports. The at least one clamp assembly is mounted onto the frame assembly, whereby the upper jaw and the lower jaw are mounted onto the upper rod. The frame assembly comprises a collapsible bracket coupled to the lower rod. The collapsible bracket comprises a slot to receive a leveling actuator.

The table assembly comprises an upper face and a lower face. The lower face comprises first and second channels to receive a tray. The table assembly is coupled to the frame assembly through the table supports. The lower face further comprises first and second sets of tension holders wherein is secured the collapsible bracket. The table assembly is collapsible and the at least one clamp assembly mounts onto an elongated structure when the clamp lever handle is actuated, and the elongated structure is secured by the upper jaw and the lower jaw. The table assembly may also comprise at least one charging outlet, power outlet, cooling fan, and/or speaker.

It is therefore one of the main objects of the present invention to provide a portable desk.

It is another object of this invention to provide a portable desk tray table.

It is another object of this invention to provide a portable desk tray table, which is secured by at least one clamp assembly.

It is another object of this invention to provide a portable desk tray table, which has a collapsible table assembly.

It is another object of this invention to provide a portable desk tray table that can be readily assembled and disassembled without the need of any special tools.

It is another object of this invention to provide a portable desk tray table, which is of a durable and reliable construction.

It is yet another object of this invention to provide a portable desk tray table, that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
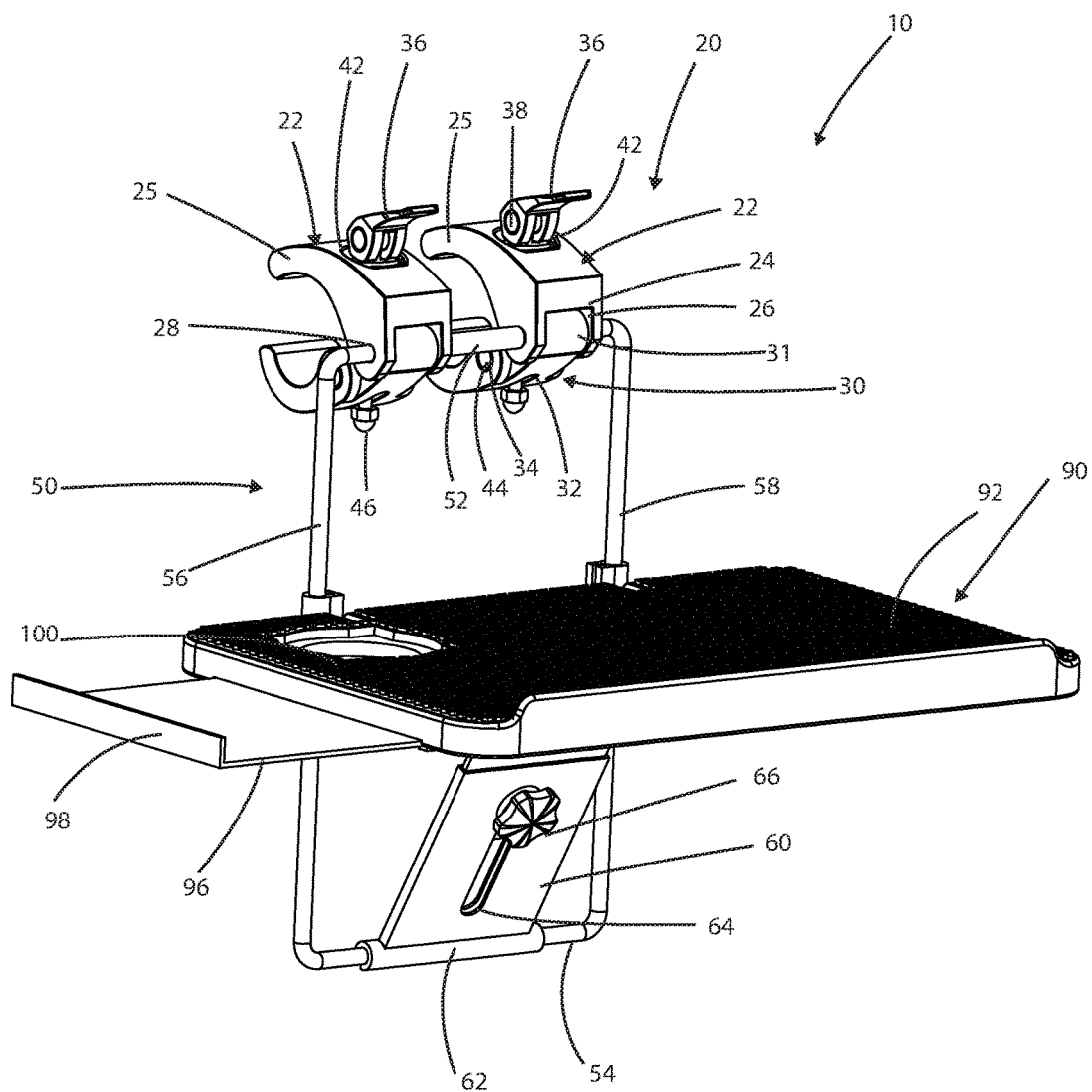
FIG. 1 represents a front isometric view of the present invention.

Referring now to the drawings, the present invention is a portable desk tray table and is generally referred to with numeral 10. It can be observed that it basically includes at least one clamp assembly 20, frame assembly 50, and table assembly 90.

As seen in FIG. 1, in a preferred embodiment there are first and second clamp assemblies 20. First and second clamp assemblies 20 each comprise upper jaw 22 and lower jaw 30. Each upper jaw 22 comprises wall 24 having notch 26, first and second lateral walls 25, and top hole 42. First and second lateral walls 25 each comprise a respective hole 28. Each lower jaw 30 comprises mounting wall 31, slot 32, and dowel nut hole 34.

Frame assembly 50 comprises upper rod 52, lower rod 54, and lateral rods 56 and 58. First and second clamp assemblies 20 are mounted onto frame assembly 50, whereby upper jaws 22 and lower jaws 30 are mounted onto upper rod 52. Notches 26 receive respective mounting walls 31, and upper rod 52 passes through mounting wall 31 having holes 28, securing first and second clamp assemblies 20 onto upper rod 52.

Figure 2:
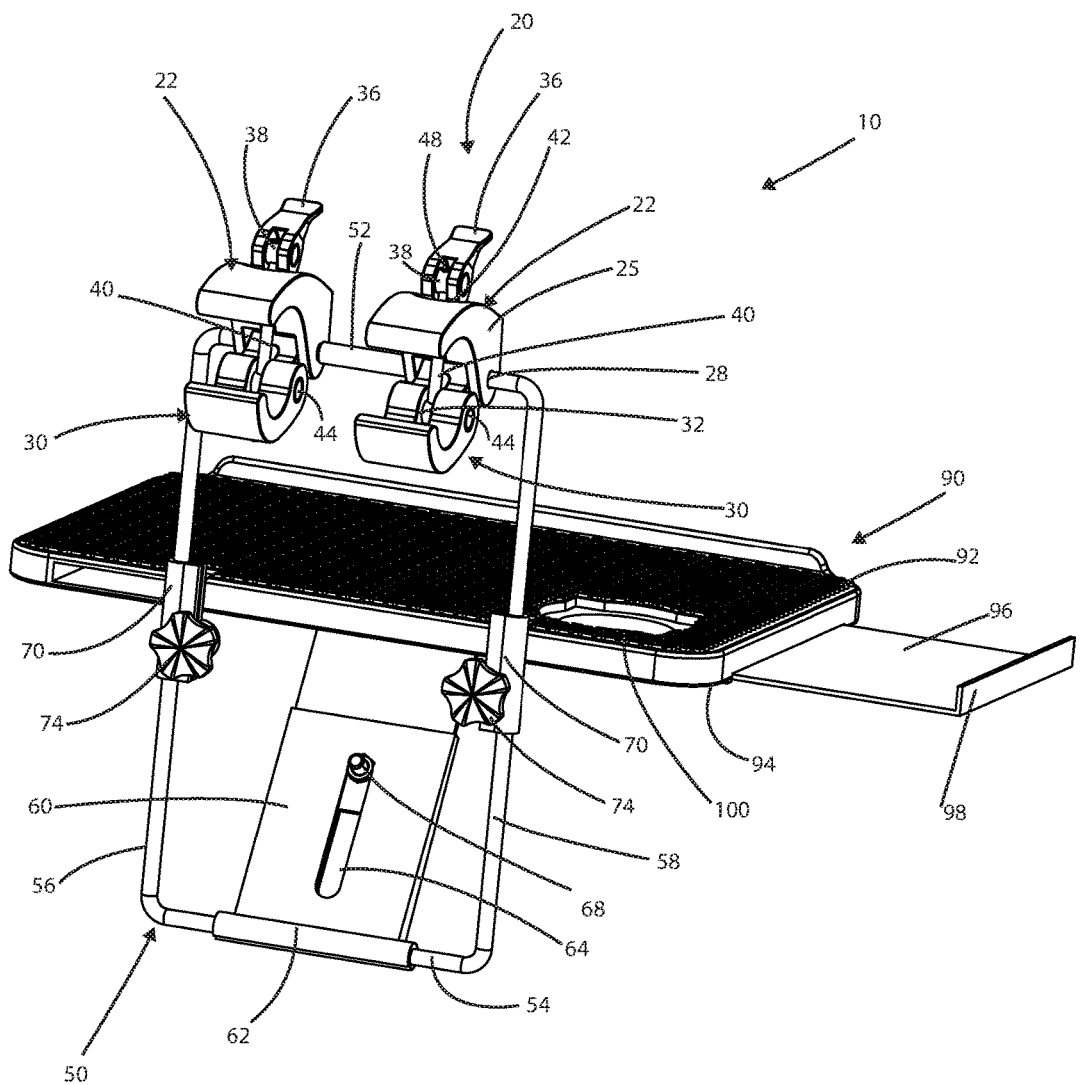
FIG. 2 is a rear isometric view of the present invention.

As seen in FIG. 2, first and second clamp assemblies 20 each further comprise clamp lever handle 36, top dowel nut 38, guide shaft 40, and bottom dowel nut 44. Each clamp lever handle 36 has lever notch 48, wherein top dowel nut 38 is coupled. Guide shaft 40 extends from top dowel nut 38 and extends through top hole 42, through bottom dowel nut 44 and through slot 32 to nut 46, seen in FIG. 3.

Frame assembly 50 further comprises collapsible bracket 60 coupled to lower rod 54, whereby lower tubing 62 is coupled to lower rod 54. Lateral rods 56 and 58 comprise respective table supports 70. Table supports 70 comprise table support bolts 74 for extending or retracting lateral rods 56 and 58.

Table assembly 90 is coupled to frame assembly 50 through table supports 70. Table assembly 90 comprises upper face 92 and lower face 94. In a preferred embodiment, table assembly 90 has tray 96 with lip 98, and cup holder 100.

Figure 3:
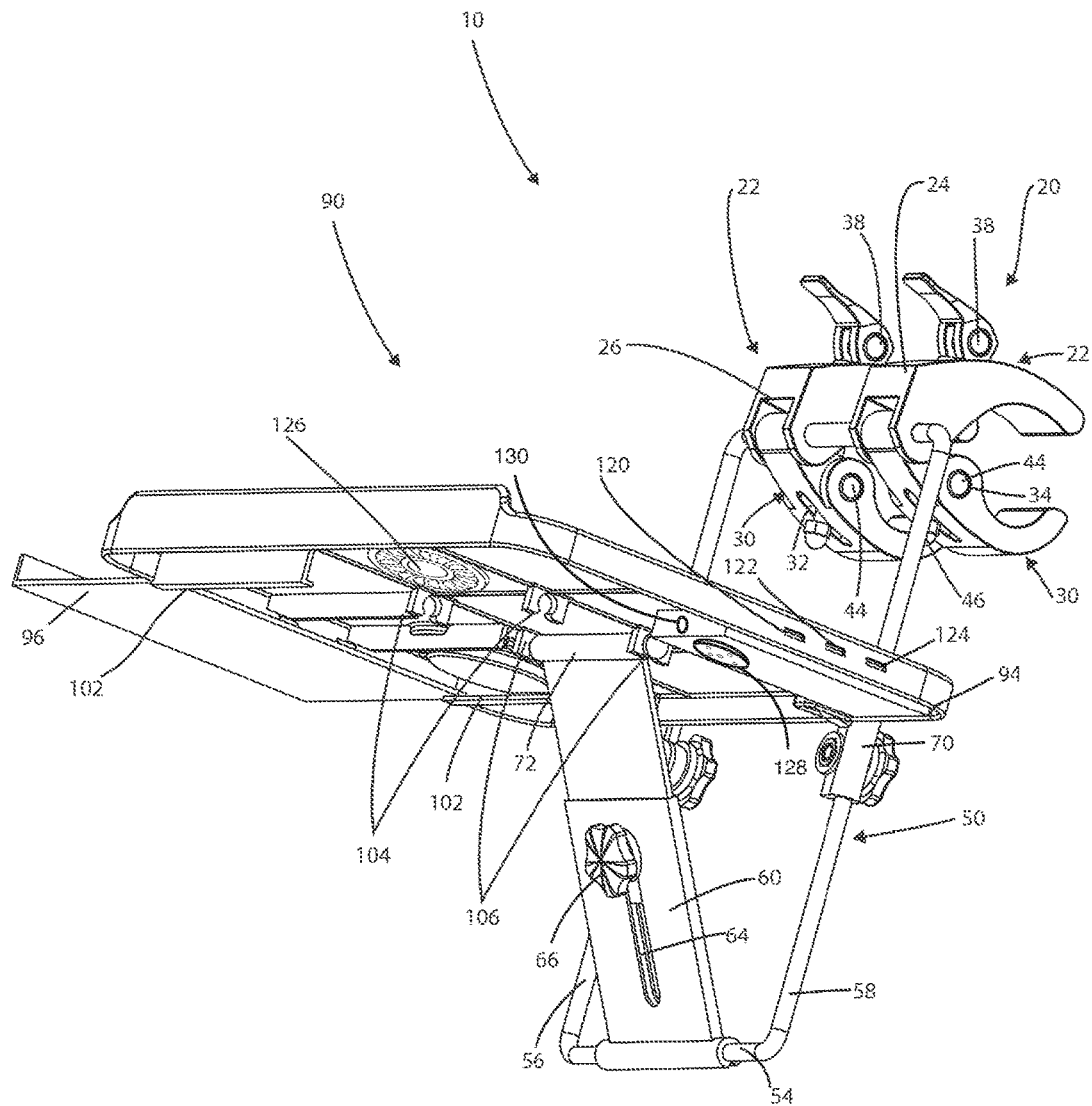
FIG. 3 is a bottom isometric view of the present invention.

As seen in FIG. 3, lower face 94 comprises first and second sets of tension holders 104 and 106. Collapsible bracket 60 is secured onto first or second sets of tension holders 104 or 106, supporting table assembly 90, whereby upper tubing 72 is positioned onto the first or second set of tension holders 104 or 106. Collapsible bracket 60 comprises slot 64 that receives leveling actuator 66. Leveling actuator 66 with nut 68, seen in FIG. 2, allows collapsible bracket 60 to extend and retract as desired.

Lower face 94 also comprises channels 102 to receive tray 96. Tray 96 slides out from under lower face 94 for additional surface area, and may be tucked away below lower face 94 when not in use. Table assembly 90 collapses when collapsible bracket 60 is removed from the first or second set of tension holders 104 or 106, whereby table assembly 90 angles downwardly.

Present invention 10 can also be used as a charging station as it may comprise at least one micro sd charging outlets 120, USB charging outlets 122 and/or a power outlet 124. An external storage unit may also be added. Present invention 10 may also comprise cooling fan 126 and can also be used in bed as a tray table or lap top table. Present invention 10 may also comprise at least one speaker 128 that can be activated either via a wireless technology standard such as "BLUETOOTH", or an auxiliary cord, not seen, at port 130.

Figure 4:
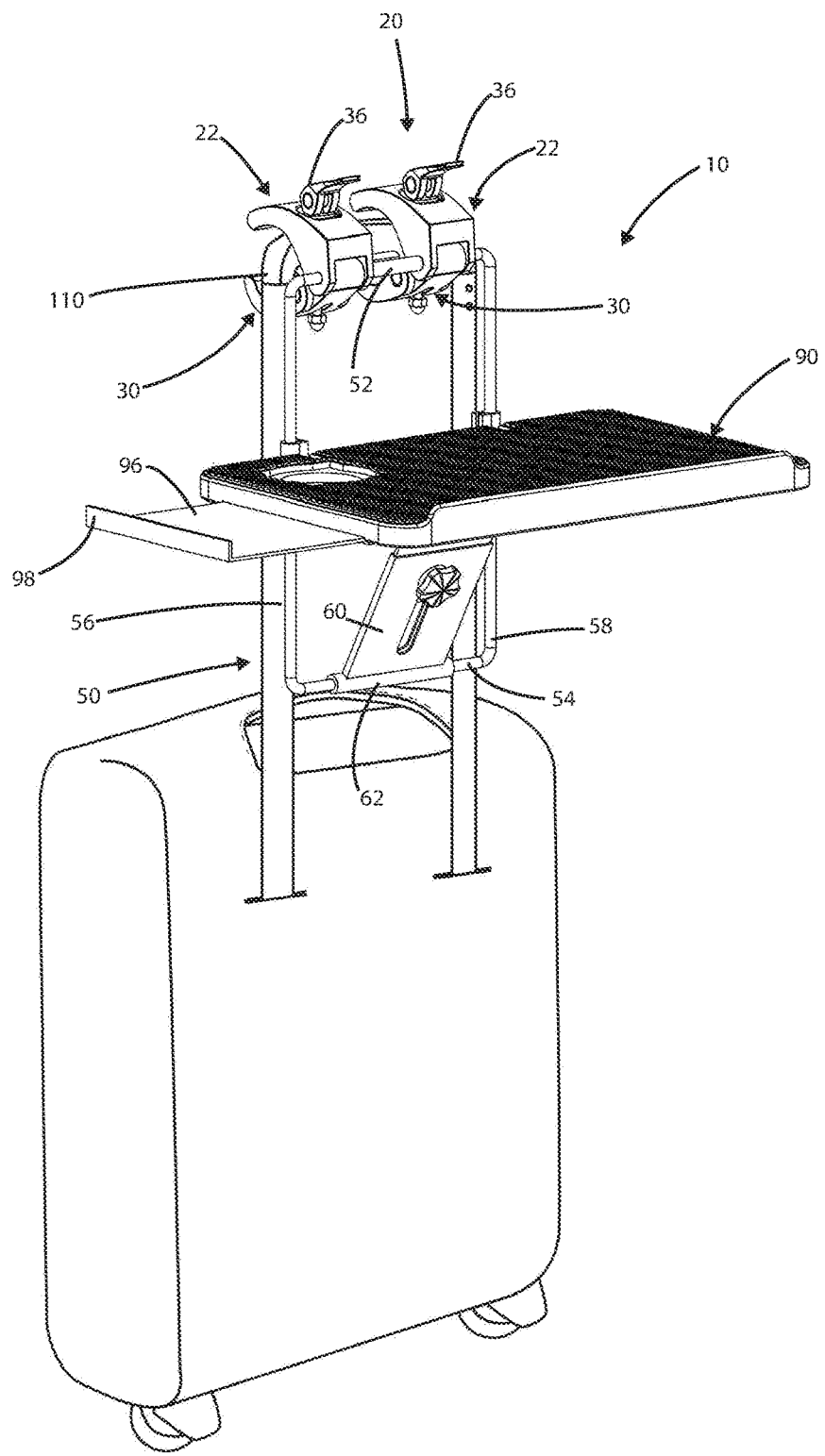
FIG. 4 represents a front isometric view of the present invention mounted onto an elongated structure.

As seen in FIG. 4, in use first and second clamp assemblies 20 mount onto elongated structure 110, wherein clamp lever handles 36 are actuated and elongated structure 110 is secured by upper jaws 22 and lower jaws 30. Elongated structure 110 can be, but is not limited to, a luggage handle, grip, or post; a seat assembly; a chair assembly; a frame assembly; or otherwise any elongated structure that may be accommodated within upper jaws 22 and lower jaws 30.

Present invention 10 can be used with any size luggage that has a handle, and in a preferred embodiment, wheels, as a portable desk tray when used at airports waiting for flights, or on flights. It can also be used in a car, train, or automobile, and it is to put computers thereon. Such a computer, not seen, can be, but is not limited to, notebooks, laptops, tablets, smart phones, cell phones, and/or electronic devices. In addition, present invention 10 can be used as a tray table for food and drinks, etc.

Present invention 10 can be used on all suitcases types, shapes, and sizes, especially on carry-on bags. Tray 96 can be used for a computer mouse of a pen. Present invention 10 may also comprise a power cord.

Present invention 10 may be of any size and color, and may include any trademark and/or service mark with or without a logo for any type of promotional purposes. Present invention 10 may be made for colleges and universities to be merchandised. Present invention 10 may comprise a carrying case.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable desk tray table, comprising:
A) at least one clamp assembly comprising an upper jaw and a lower jaw, said lower jaw comprises a mounting wall, a slot, and a dowel nut hole, said upper jaw comprises a wall having a notch, first and second lateral walls with respective holes, and a top hole;
B) a frame assembly; and
C) a table assembly.

2. The portable desk tray table set forth in claim 1, further characterized in that said at least one clamp assembly further comprises a clamp lever handle, a guide shaft, a top dowel nut, and a bottom dowel nut.

3. The portable desk tray table set forth in claim 2, further characterized in that said top dowel nut is coupled to said clamp lever handle.

4. The portable desk tray table set forth in claim 2, further characterized in that said bottom dowel nut is coupled to said lower jaw.

5. The portable desk tray table set forth in claim 2, further characterized in that said guide shaft extends from said top dowel nut.

6. The portable desk tray table set forth in claim 2, further characterized in that said guide shaft extends through said top hole, through said bottom dowel nut, and to a nut.

7. The portable desk tray table set forth in claim 2, further characterized in that said at least one clamp assembly mounts onto an elongated structure when said clamp lever handle is actuated and said elongated structure is secured by said upper jaw and said lower jaw.

8. The portable desk tray table set forth in claim 1, further characterized in that said frame assembly comprises an upper rod, a lower rod, and first and second laterals rods with respective table supports.

9. The portable desk tray table set forth in claim 8, further characterized in that said at least one clamp assembly is mounted onto said frame assembly, whereby said upper jaw and said lower jaw are mounted onto said upper rod.

10. The portable desk tray table set forth in claim 8, further characterized in that said frame assembly comprises a collapsible bracket coupled to said lower rod.

11. The portable desk tray table set forth in claim 10, further characterized in that said collapsible bracket comprises a slot to receive a leveling actuator.

12. The portable desk tray table set forth in claim 10, further characterized in that said table assembly comprises an upper face and a lower face.

13. The portable desk tray table set forth in claim 12, further characterized in that said lower face comprises first and second channels to receive a tray, and first and second sets of tension holders.

14. The portable desk tray table set forth in claim 13, further characterized in that said collapsible bracket is secured onto said first or second sets of tension holders.

15. The portable desk tray table set forth in claim 8, further characterized in that said table assembly is coupled to said frame assembly through said table supports.

16. The portable desk tray table set forth in claim 1, further characterized in that said table assembly comprises at least one charging outlet, a power outlet, a cooling fan, or at least one speaker.

* * * * *